United States Patent [19]

Swanson et al.

[11] 4,407,109
[45] Oct. 4, 1983

[54] HYDRAULIC CIRCUIT FOR LIFTING THE REEL OF AN AGRICULTURAL HARVESTER

[75] Inventors: William C. Swanson, Clarendon Hills; Eugene J. Krukow, Cordova; Norman G. Stroup, Orion, all of Ill.

[73] Assignee: International Harvester Co., Chicago, Ill.

[21] Appl. No.: 210,962

[22] Filed: Nov. 28, 1980

[51] Int. Cl.³ ............................................. A01B 63/22
[52] U.S. Cl. ..................................... 56/11.9; 91/445; 137/99; 60/484; 56/DIG. 15
[58] Field of Search .............. 60/484; 137/99; 91/445; 92/79, 78, 118; 56/11.9, DIG. 15

[56] References Cited

U.S. PATENT DOCUMENTS

| | | | |
|---|---|---|---|
| 2,873,567 | 2/1959 | Vogelaar et al. | 56/221 |
| 3,494,128 | 2/1970 | Lentz et al. | 92/79 X |
| 4,088,151 | 5/1978 | Schurger | 91/445 X |
| 4,237,688 | 12/1980 | Demmers | 60/484 |
| 4,335,894 | 6/1982 | Swanson | 137/99 X |
| 4,339,139 | 7/1982 | Swanson | 137/99 X |

FOREIGN PATENT DOCUMENTS 632201 12/1961 Canada .................................. 91/445

*Primary Examiner*—Arnold Rosenthal
*Attorney, Agent, or Firm*—John W. Gaines; F. David AuBuchon

[57] ABSTRACT

An agricultural harvesting combine is provided with a hydraulically positioned reel at the forward end of the combine. One single acting hydraulic cylinder is carried at each end of the reel. Hydraulic fluid is supplied to the cylinders through a rotary flow divider to cause each cylinder to synchronously be displaced to raise both ends of the reel in unison.

2 Claims, 2 Drawing Figures

U.S. Patent  Oct. 4, 1983  4,407,109
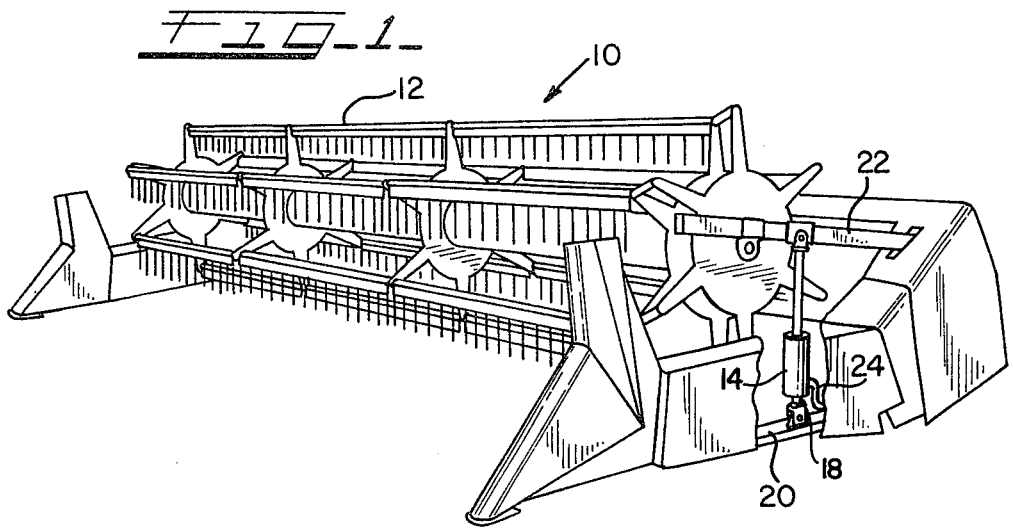
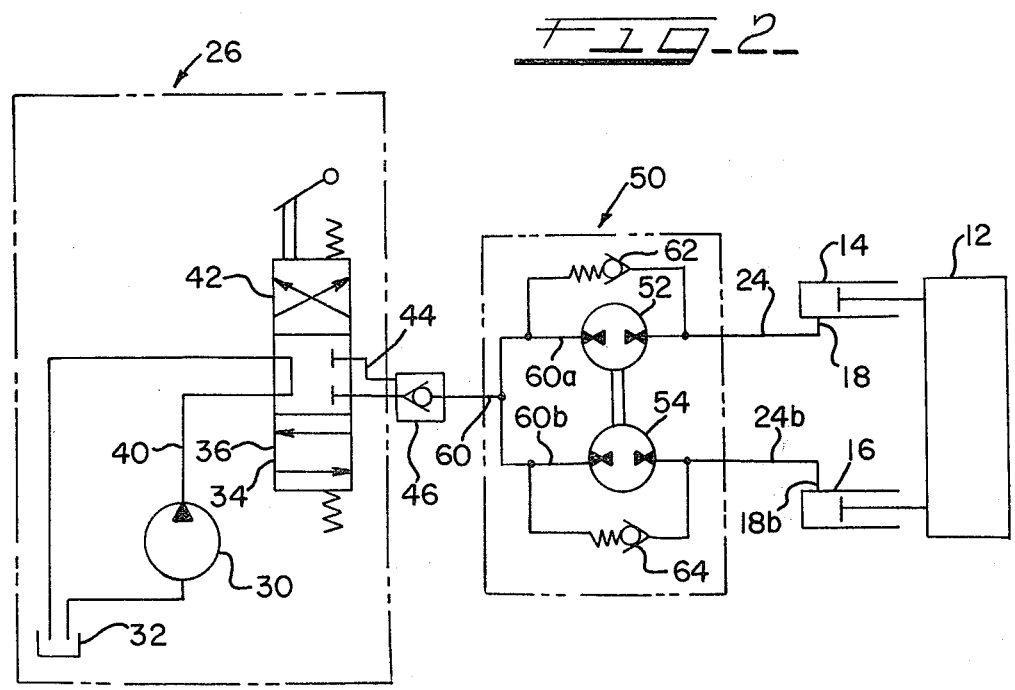

HYDRAULIC CIRCUIT FOR LIFTING THE REEL OF AN AGRICULTURAL HARVESTER

BACKGROUND OF THE INVENTION

1. Field of the Invention

This invention is concerned with harvesting machines and the crop gathering reels of harvesting machines. More specifically the specification deals with means to control the elevation of the reel so that each end of the reel moves in unison with the other end.

2. Description of the Prior Art

In a harvesting combine the combine may be equipped with a forward mounted crop gathering and cutterbar head. The cutterbar will usually be designed to follow the contour of the supporting ground while a reel, being the crop gathering component designed to bring the crop to the cutterbar and minimize grain losses, will be mounted above the cutterbar and move upwardly or downwardly generally following the position of the cutterbar. Also, the reel can be operated independently of the cutterbar, that is, the vehicle operator can raise or lower the reel at his discretion.

The reels of contemporary machines are raised and lowered through the pressurization and evacuation of a pair of hydraulic cylinders located at the ends of the reel. Typically the arrangement is a master-slave arrangement where one of the cylinders is a double acting cylinder and the other is a single acting cylinder. When the master cylinder (the double acting cylinder) is pressurized on the head side fluid in the rod side of the cylinder is pressurized and forced to the head side of the single acting cylinder causing both cylinders to extend simultaneously in a well known manner.

The difficulty in having the master-slave cylinder arrangement is that the master and slave cylinders are often of non-standard nominal diameters. With excellent engineering and design a passable reel lift system can be manufactured but size and capacity considerations are critical. With even well designed master-slave systems rephasing of the cylinders so that the ends of the reel move in unison requires special orificing and porting for the rephasing operation. In some designs rephasing requires manual venting to synchronize the cylinders.

Spool type flow divider systems are also known to be used as alternatives to master-slave cylinder systems. With spool type flow dividers the work port of each cylinder is in direct communication with the other thus making the synchronous displacement of each cylinder's piston difficult as the piston with the least resistance will tend to extend at a rate different than the cylinder with the higher resistance. Thus although the flow is divided the reel ends may not always raise in unison as will be assured in the present invention.

The contemporary prior art system requires more parts, more expensive cylinders and more complicated hose routings (increasing the risk of leakage) than the system presented by this disclosure.

SUMMARY OF THE INVENTION

An agricultural harvester is provided with a hydraulically raised and lowered reel using a hydraulic cylinder at each end of the reel. A dual-rotor rotary flow divider controls the distribution of pressurized fluid to each of the single acting hydraulic cylinders.

Hydraulic fluid supply is generated by a fixed or variable displacement pump associated with a three position four way valve with a pilot operated check valve for controlling the raising and lowering of the harvester reel.

Therefore it is an object of this invention to provide a harvester reel hydraulic raise and lower system that incorporates a rotary flow divider to ensure that both ends of the reel will be raised and lowered simultaneously.

An advantage of this invention is that it is self-purging and will rephase without the need for complex purging or rephasing devices.

This leads to the advantage of having fewer parts, fewer runs of vulnerable hydraulic tubing and a more reliable and precise system of reel vertical movement control.

BRIEF DESCRIPTION OF THE DRAWING FIGURES

The recited, as well as other advantages of this invention will be apparent from this disclosure when considered in light of the following drawing figures wherein:

FIG. 1 shows a stylized harvester head with a hydraulically elevated reel;

FIG. 2 shows a hydraulic schematic of the reel raising and lowering system.

DETAILED DESCRIPTION OF THE INVENTION

FIG. 1 is presented to set the environment of a preferred embodiment of this invention. A harvesting header generally 10 is shown separated from its host propulsion vehicle. Typically, the host vehicle will be a combine that processes the harvested crop or a windrower that simply cuts and consolidates the cut crop for latter processing. The host vehicle will supply the harvesting header with hydraulic fluid under pressure to raise and lower the reel 12. This fluid source may also be used to drive the reel's rotary motor and to provide cutterbar actuation.

One of the hydraulic cylinders 14 used to raise and control lowering of the reel is shown in its attachment area of the header.

It is contemplated that the reel cylinders could be mounted so that the rod portion is pivotally attached to the reel beam and the body portion is pivotally attached to the frame 20.

Each end of the reel is provided with an identical cylinder and attachment paraphernalia.

FIG. 2 shows the hydraulic system in a schematic representation.

The host vehicle as represented by the broken line box generally 26 contains a source of fluid pressure, typically a pump 30 that will draw hydraulic fluid from reservoir 32 and direct it through three position four way valve 34 for distribution to the reel height control system.

The figure shows a fixed displacement pump and an open center valve but a variable displacement pump and a closed center valve could be used depending on design preference.

The manual valve 34 is spring centered to neutral and can be displaced to a first position with first segment 36 aligned with the fluid supply conduit 40. When displaced to a third position the fluid segment 42 will be aligned so that the fluid supply conduit 40 is directed to pilot line 44.

A pilot operated check valve 46 will allow unimpeded fluid passage from the pump 30 to a rotary flow divider generally 50 when the manual valve 34 is in a first position. The pilot operated check valve 46 will allow flow from the rotary flow divider only when a signal in pilot line 44 generated by pump 30 is caused to open the check valve as when the manual control is in position three.

The rotary flow divider generally 50 is a hydraulic fluid control device having two or more segments each interconnected by a common shaft. Each segment is made up of a gear type or vane type fluid transfer device that can act either as a pump or a motor depending on the fluid flow through the rotary flow divider and the pressure at the output apertures of the rotary flow divider. The volume of fluid flowing through the rotary flow divider will always be equalized, although the pressure at one of the orifices may be intensified. A typical rotary flow divider is shown in U.S. Pat. No. 2,949,924 issued to A. M. Cochran, Jr. A pair of vane type fluid transfer devices are used with this invention although gear type—as used for gear type hydraulic pumps—are also used in rotary flow dividers.

In this embodiment the rotary flow divider 50 contains a first 52 and a second 54 fluid transfer device, here gear type elements (hereinafter gear pumps) connected by a single shaft 56. A bifurcated delivery conduit 60 with branches 60a and 60b is associated with an inlet of each gear pump 52 and 54 respectively. Fluid from each gear pump of the rotary flow divider passes through hydraulic supply hoses 24 and 24b to left 14 and right 16 hydraulic cylinders, respectively.

A first and a second rephasing valve 62 and 64 respectively is provided to allow flow from the cylinders 14 and 16 around first and second gear pump 52 and 54 to ensure that the cylinders contain equal amounts of fluid upon lowering the reel to ensure synchronous raising of the reel on subsequent lifts. Each cylinder, as earlier stated, is connected to one end of the reel represented as box 12 in FIG. 2.

In operation hydraulic fluid flow from the pump 30, upon opening the valve 34 to first position 36, will be uniformly divided by the equal displacements of the rotary flow divider gear pumps. The fluid flow is then delivered to the two single acting ram cylinders to raise each end of the reel 12 in unison. The conduit ports 18 and 18a are positioned at the most vertical highest point to facilitate automatic purging of trapped air as the hydraulic fluid enters the cylinder.

In the rephasing operation if the fluid volume is different i.e. greater from one cylinder to the other the rephasing valve will be unseated allowing the excess fluid to be exhausted to compensate for the difference. Since the cylinders of this embodiment are theoretically identical the volume difference could be caused by manufacturing tolerances. To ensure rephasing only at the end of the stroke of one of the rams the rephasing valves are set at values higher than the pressure drop across the rotary flow divider as generated by the cylinder return flow when the manual valve 34 is in the third position 42.

It should be clear that upon lowering of the reel the rotary flow divider will also ensure that both ends of the reel will be lowered in unison. The gear pumps will be driven "backwards" by flow from the cylinders as the source of fluid and will not allow a greater volume to pass from one or the other cylinders.

Thus it can be seen that there has been provided a hydraulic raising and lowering system for use in a harvester header reel that incorporates a rotary flow divider to ensure synchronous elevation and lowering of the harvester reel. While the invention has been described in conjunction with a specific embodiment thereof it is evident that many alternatives and variations will be apparent to those skilled in the art in light of the foregoing description. For instance it is contemplated that the hydraulic lifting cylinders could be mounted cylinder end up on the header frame and the use of the rotary flow divider would still ensure the desired synchronous lift. Accordingly, this specification is intended to embrace all such alternatives and variations as fall within the spirit and broad scope of the appended claims.

What is claimed is:

1. In an agricultural harvester having a front mounted reel mounted for hydraulically controlled vertical adjustment, including a reservoir and a source of fluid for supplying said hydraulically controlled reel, the combination of a pair of single acting hydraulic cylinders, one of each of said pair having a first end pivotally mounted to a header frame and second end pivotally attached to a moveable reel support beam;

a rotary flow divider having a pair of fluid transfer devices and a pair of outlet ports, each of said pair connected to one of said single acting hydraulic cylinders;

a control valve having three operating positions interposed between said source of fluid and said rotary flow divider for allowing control of said flow; and a check valve located downstream of said control valve and upstream of said rotary flow divider arranged to prevent flow from said rotary flow divider to said control valve, said check valve pilot operated to allow flow from said rotary flow divider to said control valve when said control valve is positioned to allow flow from said rotary flow divider to said reservoir;

said rotary flow divider comprising:

a first transfer device having a given volume of hydraulic fluid capacity and an inlet port communicating with said control valve and an outlet port communicating with one of said pair of hydraulic cylinders;

a second transfer device having a volume of hydraulic fluid capacity equal to that of said first transfer device and an inlet port communicating with said control valve and an outlet port communicating with one of said pair of hydraulic cylinders;

a common shaft interconnecting said first transfer device and said second transfer device whereby said first and second transfer devices will deliver said equal volume of fluid capacity to said hydraulic cylinders when either of said transfer devices is connected to said source of fluid pressure through said control valve;

a first rephasing valve for allowing fluid to bypass one of said pair of fluid transfer devices from one of said single acting hydraulic cylinders to said source of fluid pressure; and a second rephasing valve for allowing fluid to bypass one of said pair of fluid transfer devices from one of said single acting cylinders to said source of fluid pressure;

each of said rephasing valves set to open when the fluid volume is greater from one of said pair of hydraulic cylinders when said control valve is open allowing flow from said hydraulic cylinders to said source of fluid pressure.

2. In an agricultural harvester head having a front mounted reel hydraulically controlled for vertical adjustment, the combination of a pair of single acting hydraulic cylinders, one of each of said pair having a first end pivotally mounted to a header frame and a second end pivotally attached to a moveable reel support beam;

a rotary flow divider having a pair of fluid transfer devices and a pair of outlet ports, each of said pair connected to one of said single acting hydraulic cylinders; and a check valve located upstream of said rotary flow divider arranged to prevent flow from said rotary flow divider, said check valve pilot operated to allow flow from said rotary flow divider;

said rotary flow divider comprising:

a first transfer device having a given volume of hydraulic fluid capacity and an inlet port and an outlet port communicating with one of said pair of hydraulic cylinders;

a second transfer device having a volume of hydraulic fluid capacity equal to that of said transfer device and an inlet port and an outlet port communicating with one of said pair of hydraulic cylinders;

a common shaft interconnecting said first transfer device and said second transfer device whereby said first and second transfer devices will deliver said equal volume of fluid capacity to said hydraulic cylinders;

a first rephasing valve for allowing fluid to bypass one of said fluid transfer devices from one of said single acting hydraulic cylinders; and a second rephasing valve for allowing fluid to bypass one of said pair of fluid transfer devices from one of said single acting hydraulic cylinders;

each of said rephasing valves set to open when the fluid volume is greater from one of said pair of hydraulic cylinders.

* * * * *